United States Patent
Fang et al.

(10) Patent No.: US 11,912,806 B2
(45) Date of Patent: Feb. 27, 2024

(54) MULTIBLOCK COPOLYMER WITH NARROW MOLECULAR WEIGHT DISTRIBUTION AND PREPARATION METHOD THEREFOR

(71) Applicant: ZHEJIANG UNIVERSITY, Hangzhou (CN)

(72) Inventors: Jinwei Fang, Hangzhou (CN); Yingwu Luo, Hangzhou (CN); Xiang Gao, Hangzhou (CN); Bogeng Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 239 days.

(21) Appl. No.: 17/043,663

(22) PCT Filed: Jan. 10, 2020

(86) PCT No.: PCT/CN2020/071527
§ 371 (c)(1),
(2) Date: Sep. 30, 2020

(87) PCT Pub. No.: WO2020/207088
PCT Pub. Date: Oct. 15, 2020

(65) Prior Publication Data
US 2022/0049040 A1     Feb. 17, 2022

(30) Foreign Application Priority Data

Apr. 10, 2019   (CN) .......................... 201910285998.7

(51) Int. Cl.
C08F 293/00      (2006.01)
C08F 220/06      (2006.01)
(Continued)

(52) U.S. Cl.
CPC ........ *C08F 293/005* (2013.01); *C08F 212/08* (2013.01); *C08F 220/06* (2013.01); *C08F 220/14* (2013.01); *C08F 2438/03* (2013.01)

(58) Field of Classification Search
None
See application file for complete search history.

(56) References Cited

U.S. PATENT DOCUMENTS

2009/0299050 A1   12/2009 Zhao

FOREIGN PATENT DOCUMENTS

CN       106281147 A     1/2017
CN       106433530 A     2/2017
(Continued)

OTHER PUBLICATIONS

International Search Report (PCT/CN2020/071527); dated Apr. 3, 2020.

*Primary Examiner* — Richard A Huhn
(74) *Attorney, Agent, or Firm* — W&G Law Group

(57) ABSTRACT

The present invention discloses a multiblock copolymer with narrow molecular weight distribution and a preparation method therefor. According to the present disclosure, a series of multiblock copolymers with narrow molecular weight distribution are prepared by adopting a reversible addition chain transfer free radical polymerization technology in an emulsion polymerization system by controlling the feeding sequence of monomers. The molecular weight of the series of multiblock copolymers meets theoretical expectations, the content of dead polymers is low, and the mechanical properties are greatly improved compared with the traditional triblock copolymers. The present disclosure has the advantages of simple flow equipment, an energy-saving and environment-friendly process, cheap and readily available raw materials, achieves high control of the block number, block types, block molecular weight and other (Continued)

structures in the block polymers, and provides a universal and feasible means for preparing polymer materials with specific structures and functions.

3 Claims, 3 Drawing Sheets

(51) Int. Cl.
*C08F 220/14* (2006.01)
*C08F 212/08* (2006.01)

(56) References Cited

FOREIGN PATENT DOCUMENTS

| | | |
|---|---|---|
| CN | 106492705 A | 3/2017 |
| CN | 108470884 A | 8/2018 |
| CN | 108586642 A | 9/2018 |
| CN | 109929083 A | 6/2019 |
| JP | 2007230947 A | 9/2007 |
| JP | 2014221868 A | 11/2014 |

MULTIBLOCK COPOLYMER WITH NARROW MOLECULAR WEIGHT DISTRIBUTION AND PREPARATION METHOD THEREFOR

CROSS-REFERENCE TO RELATED APPLICATIONS

This is the United States national phase of International Patent Application No. PCT/CN2020/071527, filed on Jan. 10, 2020, which claims priority of Chinese patent application No. 2019102859987 filed on Apr. 10, 2019, the entire contents of which are incorporated herein by reference in their entireties.

TECHNICAL FIELD

The present invention relates to the field of polymer materials, and in particular to a multiblock copolymer with narrow molecular weight distribution and a preparation method therefor.

BACKGROUND

A block polymer is a special polymer obtained by connecting two or more polymer chain segments with different properties. Because the compatibility between different blocks is generally low, a nano-scale microphase separation structure will be spontaneously formed, which has different properties from random copolymers, homopolymers and polymer blends. It can be used in thermoplastic elastomers, blending compatibilizers, interface modifiers, etc., and is widely used in chemical engineering, construction, biomedicine and other fields. Compared with traditional diblock or triblock copolymers, multiblock copolymers with more block numbers and types have better performance. The results show that the multiblock copolymer with the same composition has greater tensile deformation and higher breaking strength than the tri-block copolymer. Hermel et al. found that the pentablock copolymer with composition of amorphous polycyclohexyl ethylene and crystalline polyethylene has very high toughness, while the triblock copolymer with the same composition has very low toughness. Yumi Matsumiya et al. found that the eleven blocks of polystyrene and polyisoprene can achieve tensile deformation of more than 9000% after swelling n-tetradecane. James M. Eagan et al. found that the tetrablock copolymer of polyethylene and polypropylene can be used as an excellent blending compatilizer of commercial polyethylene and polypropylene, and the obtained blended polymer reaches or even exceeds the mechanical properties of polyethylene or polypropylene matrix, which is of great significance for recycling waste polyethylene and polypropylene materials.

Homopolymer or block copolymer precursors with high reactive end groups such as isocyanate groups, sulfhydryl groups or carbon-carbon double bonds in norbornene can be connected by end group reaction to obtain multiblock copolymers, but the number of blocks and the final molecular weight of polymers cannot be accurately controlled for the products obtained by this method, and the preparation of their precursors is also difficult. A multiblock copolymer with a highly controllable structure can be prepared by living anionic polymerization, but its requirements for raw material purity and reaction environment are extremely high. After each block reaction is finished, unreacted monomer usually needs to be removed before the next reaction can be carried out. The experimental operation is cumbersome and there few types of applicable monomers. In recent decades, controllable/living radical polymerization, such as reversible addition-fragmentation chain transfer (RAFT) polymerization and atom transfer radical polymerization (ATRP), has been widely used to prepare various block copolymers with a controllable structure because of its low reaction requirements and wide range of applicable monomers.

The one-pot method for preparation of multiblock copolymers requires that the reaction of each block achieve an ultra-high conversion rate (about 99%). Since the operation of removing unreacted monomers in the middle is avoided, the polymerization efficiency can be greatly improved. However, for controllable/living radical polymerization, there is still irreversible chain termination in the reaction process, and a certain amount of dead polymer chains will be produced in the system after each reaction, and the existence of dead polymer has great influence on the controllability and performance of the multiblock copolymer structure. Reducing the molar ratio of an initiator to a RFAT reagent can effectively reduce the content of dead polymer produced in the process of "one-pot" synthesis of multiblock copolymers, but too low initiator concentration will lead to the problems of low monomer conversion and long reaction time, so the polymerization degree of each block is generally designed to be relatively low. Gody et al. successfully synthesized a series of multiblock copolymers with more than 10 blocks and a highly controllable structure by RAFT solution polymerization using acrylamide monomer with extremely low initiator concentration and extremely high chain growth rate constant ($k_p$), but the polymerization degree of each block was only 2-50. Athina Anastasaki et al. synthesized a nine-block copolymer with hydrophilic chain segments, lipophilic chain segments and fluoropolymer chain segments by photocatalytic ATRP, but the polymerization degree of each block was only 24. Athina Anastasaki et al. also successfully synthesized a symmetrical 11-block copolymer with a total molecular weight of 150 kg/mol by the same method, using acrylate monomers with higher $k_p$, but the total reaction time was still as high as 127 hours.

Compared with solution polymerization and bulk polymerization, emulsion polymerization has the advantages of fast polymerization, good heat transfer effect and viscosity of the final product, which is the most suitable polymerization method for industrialization. RAFT emulsion polymerization combines the characteristics of controllable activity in RAFT polymerization and the advantages of a high polymerization rate and a high molecular weight of products in emulsion polymerization, which has great advantages in the synthesis of block copolymers. Nikolaos et al. successfully synthesized a block copolymer with a block number as high as 21 by RAFT emulsion polymerization using methacrylate monomers with a relatively low $k_p$, and the reaction time of each block was only 2 h. However, the polymer of each block was still relatively low, only 10, which made it difficult to obtain a microphase separation effect, and this method is only suitable for methacrylate monomers.

In the previous work, we have achieved RAFT emulsion polymerization at a very low initiator concentration, and successfully synthesized polymers with an ultra-high molecular weight. The research shows that even for styrene monomers with a very low $k_p$, the reaction time only needs 1-3 hours to achieve a conversion rate of nearly 100%. At the same time, gradient copolymers with a similar nine-block structure were successfully prepared by RFAT emulsion polymerization, but the conversion rate of each block was only about 90%. However, the same method has the problem of long chain branching when synthesizing acrylate monomers and diene monomers. The PDI of the final product is as high as 3, and the molecular structure of the polymer is uncontrollable.

SUMMARY

In view of the deficiencies of the prior art, the purpose of the present invention is to provide a multiblock copolymer with narrow molecular weight distribution and a preparation method therefor.

The purpose of the present invention is realized by the following technical solution: a multiblock copolymer with narrow molecular weight distribution, having a structural general formula of R—$X_{m1}$-b-$Y_{m2}$-b-$(M_1)_{n1}$-b-$(M_2)_{n2}$-b-$(M_3)_{n3}$ . . . -b-$(M_j)_{nj}$-T, in which R is an isopropyl acid group, acetoxy and 2-nitrile acetoxy or 2-amino acetoxy; in $X_{m1}$, X is an methacrylic acid monomer unit or an acrylic acid monomer unit, $m_1$ is the average polymerization degree of X, and $m_1$=10-40; in $Y_{m2}$, Y is a styrene monomer unit or a methyl methacrylate monomer unit, $m_2$ is the average polymerization degree of Y, and $m_2$=3-10; $M_1$, $M_2$, $M_3$ . . . $M_j$ are comonomers of the copolymer, and are selected from styrene, methyl acrylate, ethyl acrylate, butyl acrylate, tert-butyl acrylate, isobutyl acrylate, 2-ethylhexyl acrylate, methyl methacrylate, ethyl methacrylate, tert-butyl methacrylate, n-butyl methacrylate, methyl 2-ethylhexyl acrylate, acrylonitrile, isoprene, butadiene or a mixture of some monomers thereof, where j=4-20; $n_1$, $n_2$, $n_3$ . . . $n_j$ are the average polymerization degrees of respective blocks of the polymer, and $n_1$, $n_2$, $n_3$ . . . $n_j$=50-2000; T is an alkyl dithioester group or an alkyl trithioester group; and a final PDI of the polymer is less than 2.0.

The present invention further provides a preparation method for the above multiblock copolymer, including:

step 1 of dissolving 0.6-3 parts by weight of an amphiphilic macromolecule reversible addition-fragmentation chain transfer reagent in 20-50 parts by weight of water while stirring, subsequently adding 5-15 parts by weight of an $M_1$ monomer, stirring and pre-emulsifying and then adding the mixture into a reactor; heating the reactor to 30-80° C., keeping stirring, and introducing nitrogen to remove oxygen for more than 30 minutes; adding 0.001-0.05 parts by weight of an initiator into a reaction system; after reacting for 1-5 hours, adding 5-10 parts by weight of a sodium hydroxide aqueous solution containing 0.05-0.2 parts by weight of sodium hydroxide, and continuing to react for 0.2-0.5 hour to obtain a block copolymer R—$X_{m1}$-b-$Y_{m2}$-b-$(M_1)_{n1}$-T, in a form of particles stably dispersed in water to form a latex.

step 2 of after the reaction in the step 1 is finished, adding 5-30 parts by weight of an $M_2$ monomer and 20-100 parts by weight of water, keeping a reaction temperature unchanged or adjusting the reaction temperature within a range of 30-80° C., then adding 0.001-0.05 part by weight of the initiator, and reacting for 1-10 hours to obtain a block copolymer R—$X_{m1}$-b-$Y_{m2}$-b-$(M_1)_{n1}$-b-$(M_2)_{n2}$-b-T, in a form of particles stably dispersed in water to form a latex;

step 3 of after the reaction in the step 2 is finished, sequentially adding 5-30 parts by weight of $M_3$, $M_4$ . . . $M_j$ monomers and 20-100 parts by weight of water, keeping the reaction temperature unchanged or adjusting the reaction temperature within a range of 30-80° C., then adding 0.001-0.05 part by weight of the initiator, and reacting for 1-15 hours in each reaction segment to obtain a j-block copolymer R—$X_{m1}$-b-$Y_{m2}$-b-$(M_1)_{n1}$-b-$(M_2)_{n2}$-b-$(M_3)_{n3}$ . . . -b-$(M_j)_{nj}$-T, in a form of particles stably dispersed in water to form a latex; and step 4 of demulsifying, cleaning and drying the obtained latex to finally obtain white or yellowish polymer powders or particles.

Furthermore, the structural general formula of the amphiphilic macromolecule reversible addition-fragmentation chain transfer reagent is:

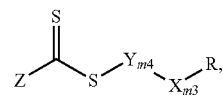

in which, Z is alkylthio, alkyl, phenyl or benzyl with 4 to 12 carbon atoms, S is sulfur element, Y is a styrene monomer unit or methyl methacrylate unit, X is a methacrylic monomer unit or acrylic monomer unit, and R is an isopropyl acid group, acetoxy, 2-nitrile acetoxy or 2-amino acetoxy; $m_3$ is the average polymerization degree of the X monomer unit, m3=3-10, m4 is the average polymerization degree of the Y monomer unit, m4=10-40.

Furthermore, when the reaction temperature is 60-80° C., the initiator is ammonium persulfate, potassium persulfate, hydrogen peroxide, or hydrogen peroxide derivatives; and when the reaction temperature is 30-60° C., the initiator is azodiisobutylimidazoline hydrochloride, azodiisobutylamidine hydrochloride, 2-hydroxy-4'-(2-hydroxyethoxy)-2-methylphenylacetone, a sodium hydrogen persulfate/potassium persulfate redox initiator or a sodium persulfate/ammonium persulfate redox initiator.

Furthermore, when the monomer is styrene, methyl methacrylate, ethyl methacrylate, tert-butyl methacrylate, n-butyl methacrylate, 2-ethylhexyl methacrylate or acrylonitrile or a mixture of some monomers thereof, the reaction temperature is adjusted to 60-80° C.; and when the monomer is methyl acrylate, ethyl acrylate, n-butyl acrylate, tert-butyl acrylate, isobutyl acrylate, 2-ethylhexyl acrylate, isoprene, butadiene or a mixture of some monomers thereof, the reaction temperature is adjusted to 30-60° C.

The present invention has the beneficial effects: by adopting an emulsion polymerization system and combining the reversible addition-fragmentation chain transfer free radical polymerization technology, a multiblock copolymer with a highly controllable structure can be efficiently synthesized, and an effective means is provided for customizing the molecular structure and performance of the polymer. The present invention has the following characteristics:

1. Emulsion polymerization has the advantages of a low viscosity, high heat transfer efficiency and less pollution, which is convenient for industrialization and continuous production;

2. Emulsion polymerization has free radical isolation effect, and the free radicals in different particles do not react, which reduces the termination rate of free radicals. At the same time, it has the characteristics of a high polymerization rate and a high molecular weight, and the polymerization rate can still be maintained at a high level even at a very low initiator concentration.

3. An amphiphilic macromolecule reversible addition-fragmentation chain transfer reagent is used as a chain transfer agent and an emulsifier at the same time, which can control the molecular structure and distribution of the final product and also avoid the complicated operation of removing any additional emulsifiers.

4. The molecular structure of the prepared multiblock copolymer is highly controllable, the molecular weight distribution is narrow, and the application range of the monomers is wide.

5. Compared with triblock copolymers, multiblock copolymers with the same composition and narrow molecular weight distribution have more excellent mechanical properties and hot processing properties.

DESCRIPTION OF EMBODIMENTS

Figure 1:
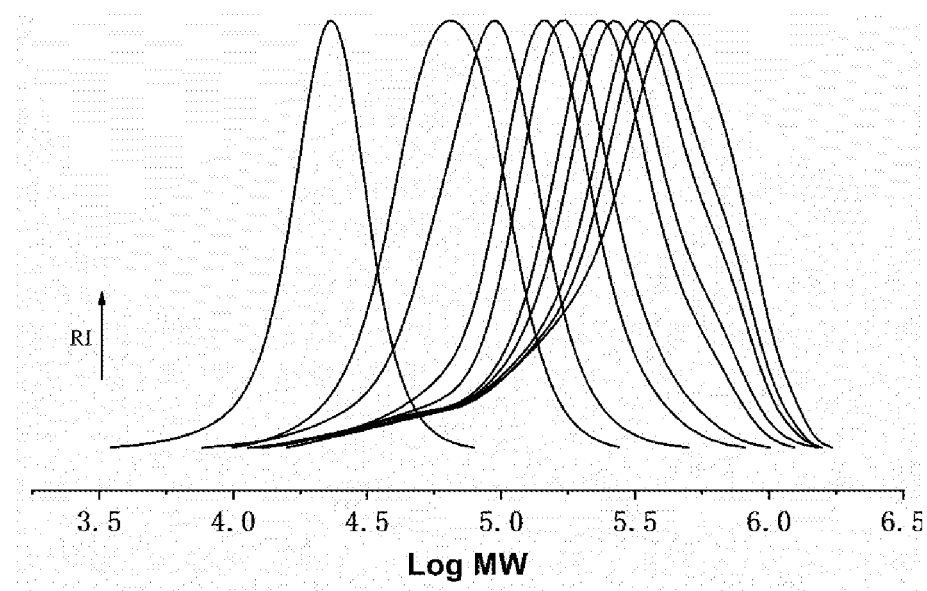
FIG. 1 shows a GPC curve of each block polymer sample in the reaction process for a decablock polymer in Example 1 of the present invention.

The present invention relates to a multiblock copolymer with narrow molecular weight distribution prepared by reversible addition-fragmentation chain transfer emulsion polymerization and a preparation method therefor including the following steps:

(1) 0.6-3 parts by weight of an amphiphilic macromolecule reversible addition-fragmentation chain transfer reagent were dissolved in 20-50 parts by weight of water while stirring, then 5-15 parts by weight of an $M_1$ monomer were added, stirred and pre-emulsified and then added into a reactor; the reactor was heated to 30-80° C., keeping stirring, and nitrogen was introduced to remove oxygen for more than 30 minutes; 0.001-0.05 parts by weight of an initiator were added into a reaction system; after reacting for 1-5 hours, 5-10 parts by weight of a sodium hydroxide aqueous solution containing 0.05-0.2 parts by weight of sodium hydroxide were added, and reaction was continued for 0.2-0.5 hour to obtain a block copolymer R—$X_{m1}$-b-$Y_{m2}$-b-$(M_1)_{n1}$-T, in the form of particles stably dispersed in water to form a latex;

(2) after the reaction in the first step was finished, 5-30 parts by weight of an $M_2$ monomer and 20-100 parts by weight of water were added, the reaction temperature was kept unchanged or adjusted within a range of 30-80° C., then 0.001-0.05 part by weight of the initiator was added, and reacted for 1-10 hours to obtain a block copolymer R—$X_{m1}$-b-$Y_{m2}$-b-$(M_1)_{n1}$-b-$(M_2)_{n2}$-b-T, in the form of particles stably dispersed in water to form a latex;

(3) after the reaction in the second step was finished, 5-30 parts by weight of $M_3$, $M_4$ . . . $M_j$ monomers and 20-100 parts by weight of water were added sequentially, the reaction temperature was kept unchanged or adjusted within a range of 30-80° C., then 0.001-0.05 part by weight of an initiator is added, and reacted for 1-15 hours in each stage to obtain a j-block copolymer R—$X_{m1}$-b-$Y_{m2}$-b-$(M_1)_{n1}$-b-$(M_2)_{n2}$-b-$(M_3)_{n3}$ . . . -b-$(M_j)_{nj}$-T, in the form of particles stably dispersed in water to form a latex;

(4) the obtained latex was demulsified, cleaned and dried to finally obtain white or yellowish polymer powder or particles.

The structural formula of the amphiphilic macromolecule reversible addition-fragmentation chain transfer reagent used in step (1) is:

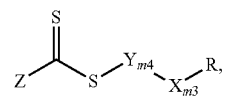

in which, Z is alkylthio, alkyl, phenyl or benzyl with 4 to 12 carbon atoms, S is sulfur element, Y is a styrene monomer unit or methyl methacrylate unit, X is a methacrylic monomer unit or acrylic monomer unit, and R is an isopropyl acid group, acetoxy, 2-nitrile acetoxy or 2-amino acetoxy; $m_3$ is the average polymerization degree of the X monomer unit, m3=3-10, m4 is the average polymerization degree of the Y monomer unit, m4=10-40.

Furthermore, when the reaction temperature is 60-80° C., the initiator is ammonium persulfate, potassium persulfate, hydrogen peroxide and hydrogen peroxide derivatives; when the reaction temperature is 30-60° C., the initiator isazodiisobutylimidazoline hydrochloride, azodiisobutylamidine hydrochloride, 2-hydroxy-4'-(2-hydroxyethoxy)-2-methylphenylacetone, sodium hydrogen persulfate/potassium persulfate redox initiator or sodium persulfate/ammonium persulfate redox initiator.

When the monomer is styrene (St), methyl methacrylate (MMA), ethyl methacrylate (EMA), tert-butyl methacrylate (tBMA), n-butyl methacrylate (nBMA), 2-ethylhexyl methacrylate (EHMA) or acrylonitrile (AN) or a mixture thereof, the reaction temperature is adjusted to 60-80° C., and when the monomer is methyl acrylate (MA), ethyl acrylate (EA), n-butyl acrylate (nBA), tert-butyl acrylate (tBA), isobutyl acrylate (iBA), 2-ethylhexyl acrylate (EHA), isoprene and butadiene or a mixture thereof, the reaction temperature is adjusted to 30-60° C.

The present invention will be described in detail below with reference to the drawings and examples.

In the following examples, the conversion rate of each monomer is measured by the gravimetric method.

The theoretical molecular weight is calculated by the following formula:

$$M_{n,th} = \frac{m \cdot x}{[\text{RAFT}]} + M_{n,RAFT}$$

where, $M_{n,th}$ refers to a designed value of the molecular weight of the polymer at the end of each step of reaction, m is the total mass of monomers added in the step, x is the conversion rate, [RAFT] is the amount of the amphiphilic reversible addition-fragmentation chain transfer reagent added before the start of reaction, and $M_{n,RAFT}$ is the molecular weight of the amphiphilic reversible addition-fragmentation chain transfer reagent.

The molecular weight of the polymer was characterized by a gel permeation chromatography Waters1525-2414-717GPC instrument, and the eluent is tetrahydrofuran, which was corrected by a narrow distribution polystyrene standard sample.

The glass transition temperature of the polymer was measured on a DSC Q200 instrument, and heated from −90° C. to 150° C. at a heating rate of 10° C./min in nitrogen atmosphere.

The AFM image of the polymer surface was measured by an atomic force microscope, and the test mode was tapping.

The tensile properties of the polymer were measured on a UTM2102 universal material testing machine, with a test standard of GB 16421-1996 and a test rate of 20 mm/min.

The chemical structural formulas of the amphiphilic macromolecule reversible addition-fragmentation chain transfer reagents used in the examples of the invention are as

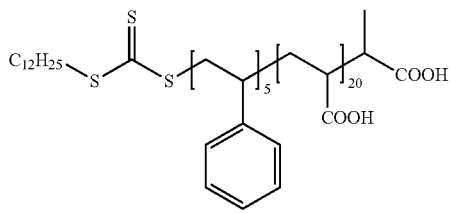

Amphiphilic macromolecule reversible addition-fragmentation chain transfer reagent (1)

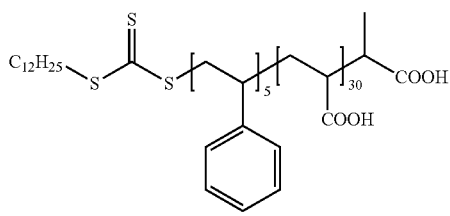

Amphiphilic macromolecule reversible addition-fragmentation chain transfer reagent (2)

Example 1

Step 1: 0.15 parts by weight of an amphiphilic macromolecule reversible addition-fragmentation chain transfer reagent (1) were dissolved in 35 parts by weight of deionized water while stirring, then 7.5 parts by weight of St were added, stirred and pre-emulsified and then added into a reactor; the reactor was heated to 80° C., keeping stirring, and nitrogen was introduced to remove oxygen for more than 30 minutes; 0.01 parts by weight of KPS was added into a reaction system; after reacting for 1 hour, 5 parts by weight of a sodium hydroxide aqueous solution containing 0.16 parts by weight of sodium hydroxide were added, and reaction was continued for 0.2 hour to obtain a block copolymer R-AA$_{m1}$-b-St$_{m2}$-b-(St)$_{n1}$-T, in the form of particles stably dispersed in water to form a latex;

Step 2: after the reaction in the step 1 is finished, 15 parts by weight of nBA and 20 parts by weight of deionized water were added, the reaction temperature was adjusted to 45° C., then 0.008 part by weight of VA044 was added, and reacted for 4 hours to obtain a block copolymer R-AA$_{m1}$-b-St$_{m2}$-b-(St)$_{n1}$-b-(nBA)$_{n2}$-T, in the form of particles stably dispersed in water to form a latex;

Step 3: after the reaction in the step 2 is finished, 7.5 parts by weight of St, 15 parts by weight of nBA, 7.5 parts by weight of St and 15 parts by weight of nBA were added sequentially, the reaction temperature was kept at 45° C., and meanwhile 26 parts by weight of deionized water and 0.004 part by weight of VA044 were added each time, reacted for 5 hours in each stage to obtain a hexablock copolymer R-AA$_{m1}$-b-St$_{m2}$-b-(St)$_{n1}$-b-(nBA)$_{n2}$-b-(St)$_{n3}$-b-(nBA)$_{n4}$-b-(St)$_{n5}$-b-(nBA)$_{n6}$-T, in the form of particles stably dispersed in water to form a latex;

Step 4: after the reaction in the step 3 was finished, 7.5 parts by weight of St and 15 parts by weight of nBA were added sequentially, and meanwhile 26 parts by weight of deionized water were added each time, the reaction temperature was kept at 40° C., and 0.008 parts by weight of VA044 was added each time, reacted for 6 hours in each stage to obtain an octablock copolymer R-AA$_{m1}$-b-St$_{m2}$-b-(St)$_{n1}$-b-(nBA)$_{n2}$-b-(St)$_{n3}$-b-(nBA)$_{n4}$-b-(St)$_{n5}$-b-(nBA)$_{n6}$-b-(St)$_{n7}$-b-(nBA)$_{n8}$-T, in the form of particles stably dispersed in water to form a latex; and Step 5: after the reaction in the step 4 was finished, 7.5 parts by weight of St and 15 parts by weight of nBA were added sequentially, and 26 parts by weight of deionized water were added each time, the reaction temperature was kept at 35° C., and 0.012 parts by weight of VA044 was added each time, reacted for 8 hours in each stage to obtain a decablock copolymer R-AA$_{m1}$-b-St$_{m2}$-b-(St)$_{n1}$-b-(nBA)$_{a2}$-b-(St)$_{n3}$-b-(nBA)$_{n4}$-b-(St)$_{n5}$-b-(nBA)$_{n6}$-b-(St)$_{n7}$-b-(nBA)$_{n8}$-b-(St)$_{n9}$-b-(nBA)$_{n10}$-T, in the form of particles stably dispersed in water to form a latex;

Step 6: the obtained latex was demulsified, cleaned and dried to finally obtain white polymer powder or particles.

Figure 2:
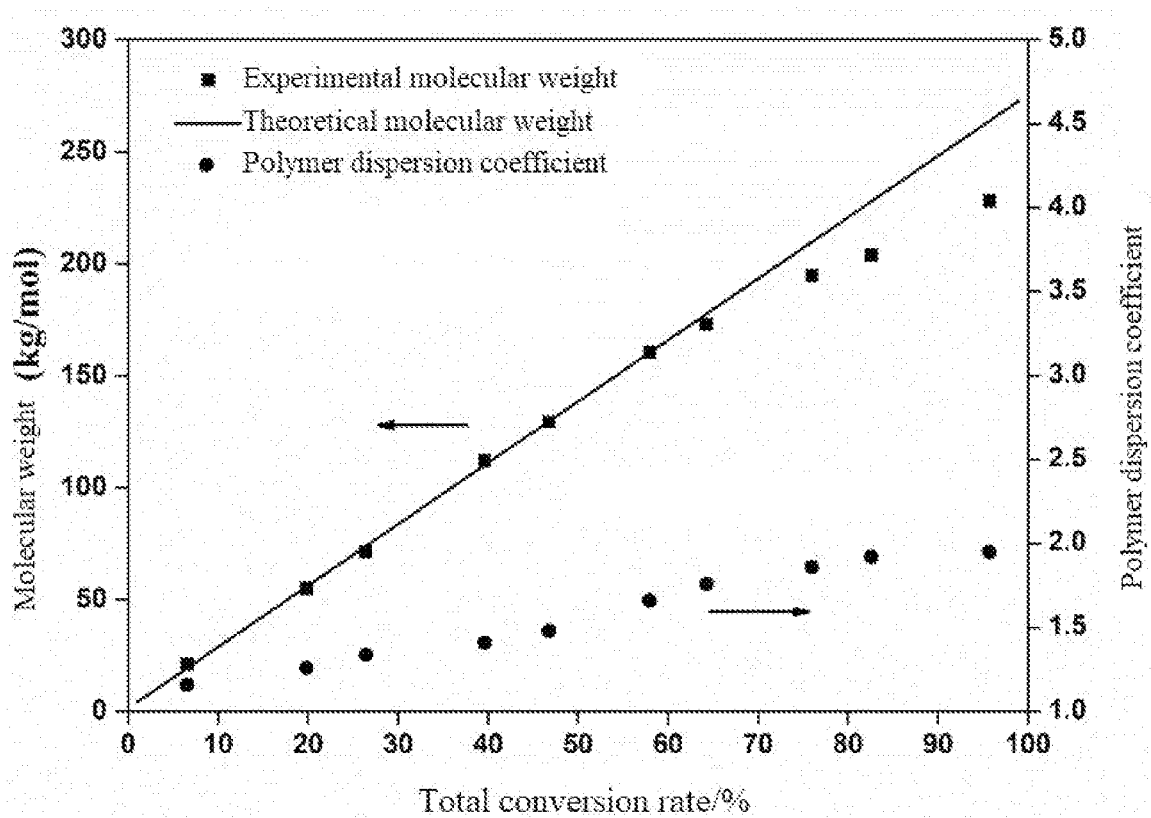
FIG. 2 shows the variation trend of the experimental molecular weight, the theoretical molecular weight and the PDI of each block polymer sample with the total reaction conversion rate in Example 1 of the present invention, wherein the total reaction conversion rate indicates the ratio of reaction monomers to all monomers in the decablock reaction process before the end of each block reaction.
Figure 3:
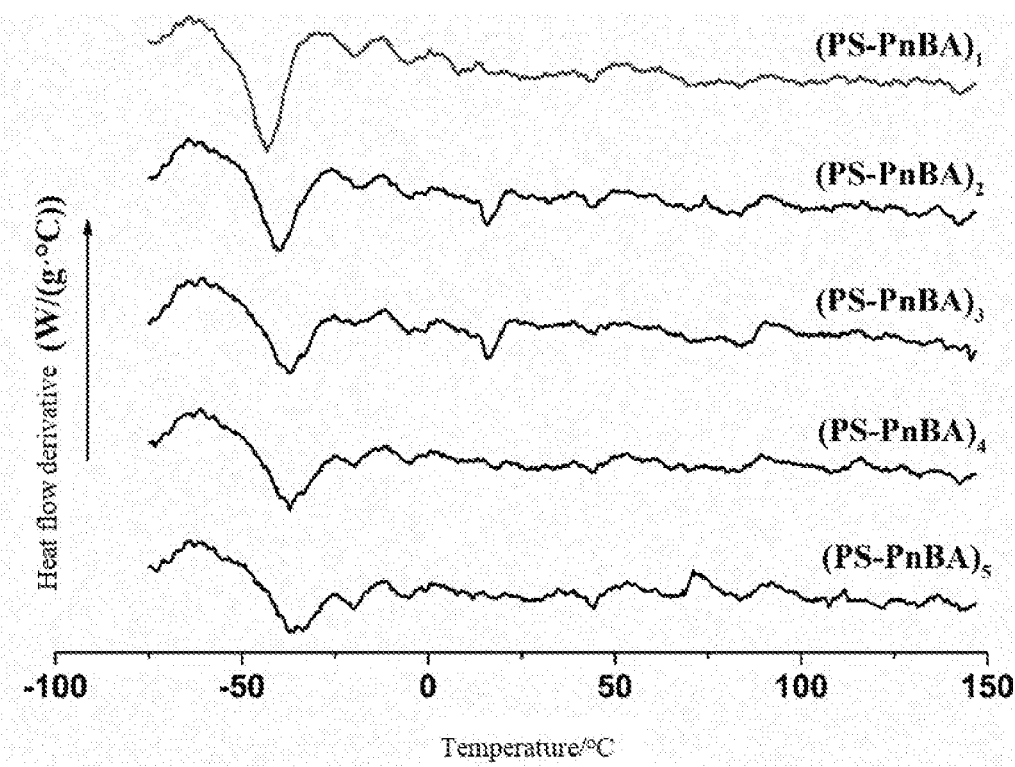
FIG. 3 shows DSC curves of five block polymers obtained in the polymerization process of Example 1 of the present invention.
Figure 4:
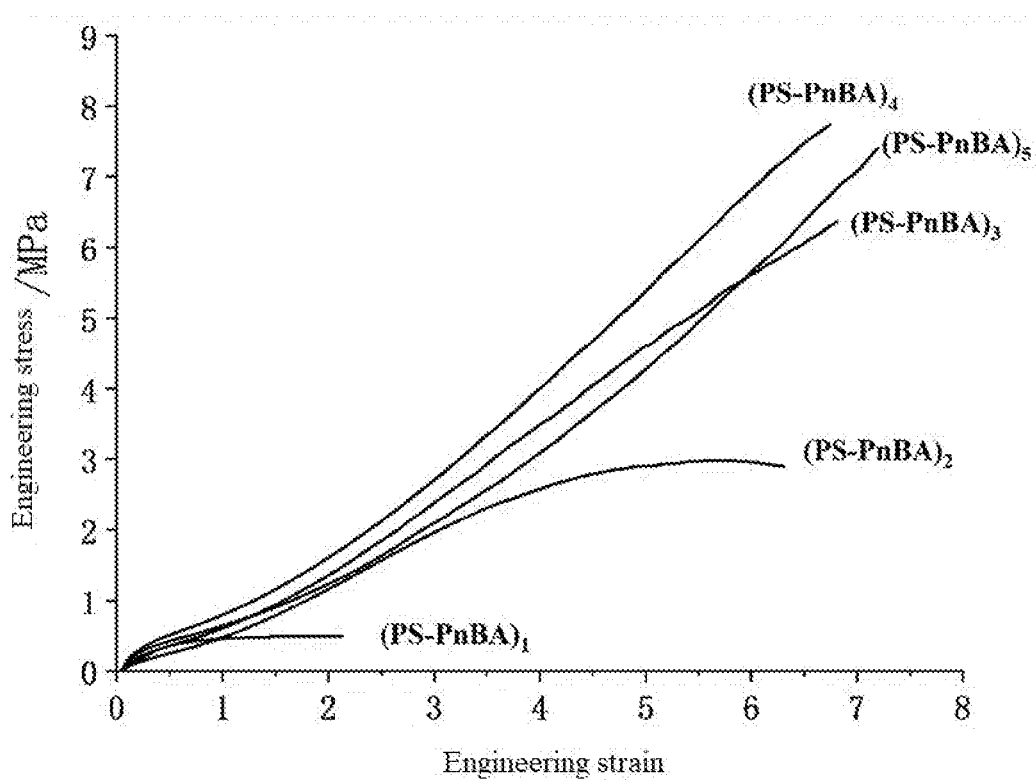
FIG. 4 shows the mechanical tensile curves of five block polymers obtained in the polymerization process of Example 1 of the present invention.

FIG. 1 shows the GPC curve of the block polymer obtained after the end of each block reaction. It can be seen that the molecular weight of the block polymer shifts to the high molecular weight with the increase of the number of blocks, indicating that the product is a block copolymer. FIG. 2 shows the change curve of the molecular weight and polymer dispersion coefficient of the block polymer with a total conversion rate. It can be seen that the molecular weights of the first seven block polymers increase linearly with the total conversion rate and approach the theoretical values, while the molecular weights of the latter three block polymers are slightly lower than the theoretical values, and the PDIs of all block polymers are less than 2, indicating that the molecular structures of the block copolymers obtained are highly controllable. According to the AFM images of the five block copolymers obtained during polymerization, it can be seen that there is a significant phase separation between a PS phase and a PnBA phase in all samples. Also in FIG. 3, the glass transition temperatures of the PnBA phase were observed in the range of −42 to −35° C. for five block polymers, which further proved the structure of a microphase separation structure in the samples. FIG. 4 shows the mechanical tensile curves of the five block copolymers. It can be seen from the figure that except for two blocks, the other four polymers show elastic deformation. However, with the increase of the number of blocks from four blocks to eight blocks, the modulus and breaking strength of the polymers are significantly increased, while the modulus and breaking strength of the decablock copolymers are slightly lower than those of the octablock copolymers, but the elongation at break is lower than that of the octablock copolymers This may be due to the high content of dead polymers in decablock copolymers. In general, the results in FIG. 4 show that the mechanical properties of the block copolymers are significantly improved with the increase of the number of blocks.

Example 2

Step 1: 1.15 parts by weight of an amphiphilic macromolecule reversible addition-fragmentation chain transfer reagent (1) were dissolved in 50 parts by weight of deionized water while stirring, then 7.5 parts by weight of St were added, stirred and pre-emulsified and then added into a reactor; the reactor was heated to 80° C., keeping stirring, and nitrogen was introduced to remove oxygen for more than 30 minutes; 0.01 parts by weight of KPS was added into a reaction system; after reacting for 1 hour, 4 parts by weight of a sodium hydroxide aqueous solution containing 0.12 parts by weight of sodium hydroxide were added, and reaction was continued for 0.2 hour to obtain a block copolymer R-AA$_{m1}$-b-St$_{m2}$-b-(St)$_{n1}$-T in the form of particles stably dispersed in water to form a latex;

Step 2: after the reaction in the step 1 is finished, 30 parts by weight of nBA and 60 parts by weight of deionized water were added, the reaction temperature was adjusted to 45° C., then 0.012 part by weight of VA044 was added, and reacted for 6 hours to obtain a block copolymer R-AA$_{m1}$-b-St$_{m2}$-b-(St)$_{n1}$-b-(nBA)$_{n2}$-T in the form of particles stably dispersed in water to form a latex;

Step 3: after the reaction in the step 2 is finished, 15 parts by weight of St and 26 parts by weight of deionized water were added sequentially, the reaction temperature was kept at 45° C., and meanwhile 0.004 part by weight of VA044 was added each time, reacted for 8 hours to obtain a triblock copolymer R-AA$_{m1}$-b-St$_{m2}$-b-(St)$_{n1}$-b-(nBA)$_{n2}$-b-(St)$_{n3}$-T in the form of particles stably dispersed in water to form a latex;

Step 4: after the reaction in the step 3 was finished, 30 parts by weight of nBA, 7.5 parts by weight of St and 40 parts by weight of deionized water were added sequentially, the reaction temperature was kept at 35° C., and 0.008 parts by weight of VA044 was added each time, reacted for 8 hours in each stage to obtain a pentablock copolymer R-AA$_{m1}$-b-St$_{m2}$-b-(St)$_{n1}$-b-(nBA)$_{n2}$-b-(St)$_{n3}$-b-(nBA)$_{n4}$-b-(St)$_{n5}$-T in the form of particles stably dispersed in water to form a latex; and Step 5: the obtained latex was demulsified, cleaned and dried to finally obtain white polymer powders or particles.

Figure 5:
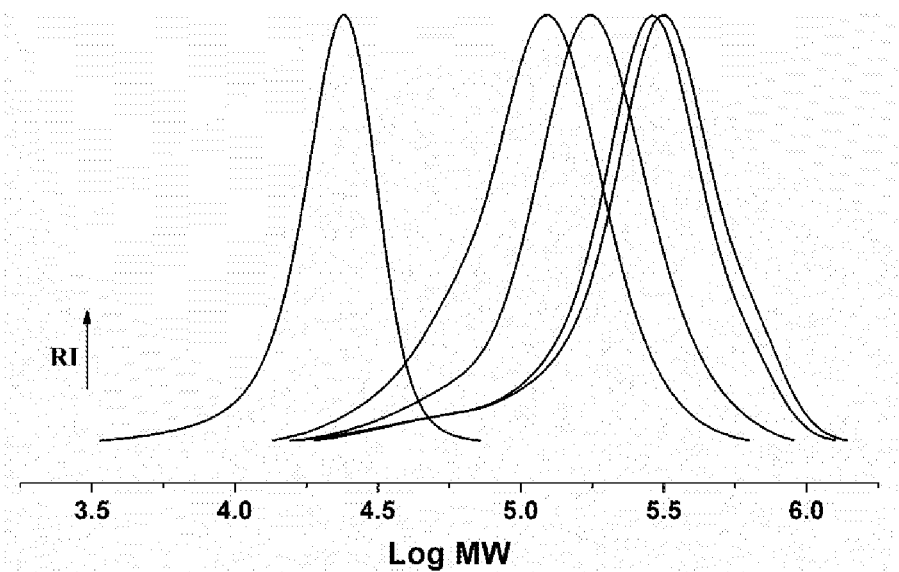
FIG. 5 shows a GPC curve of each block polymer sample during the reaction for the pentablock polymer in Example 2 of the present invention.
Figure 6:
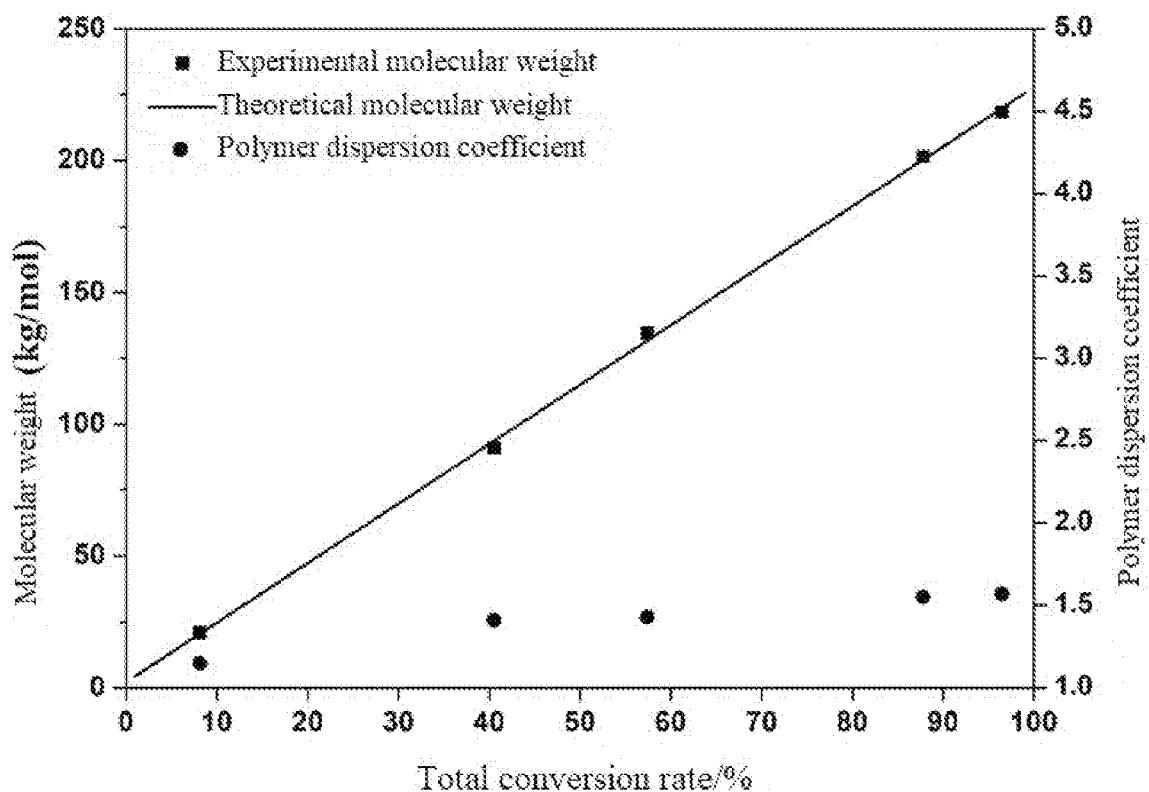
FIG. 6 shows the variation trend of the experimental molecular weight, the theoretical molecular weight and the PDI of each block polymer sample in embodiment 2 of the present invention with the total reaction conversion rate in Example 2 of the present invention, wherein the total reaction conversion rate indicates the ratio of reaction monomers to all monomers in the decablock reaction process before the end of each block reaction.

FIG. 5 shows the GPC curve of the block polymer obtained after the end of each block reaction. It can be seen that the molecular weight of the block polymer shifts to the high molecular weight with the increase of the number of blocks, indicating that the product is a block copolymer. FIG. 6 shows the change curve of the molecular weight and polymer dispersion coefficient of the block polymer with a total conversion rate. It can be seen that the molecular weights of block polymers increase linearly with the total conversion rate, and are very close to the theoretical values, and PDIs of all block polymers are less than 1.6, indicating that the molecular structures of the block copolymers obtained are highly controllable. A multiblock copolymer with a large number of blocks and a low molecular weight of each block was synthesized in Example 1, and a multiblock copolymer with a high molecular weight of each block but a small number of blocks was synthesized in Example 2, which proves that the molecular structures of the products can be accurately controlled in the synthesis of the multiblock copolymers.

Example 3

Step 1: 0.6 parts by weight of an amphiphilic macromolecule reversible addition-fragmentation chain transfer reagent (1) were dissolved in 20 parts by weight of deionized water while stirring, then 5 parts by weight of St were added, stirred and pre-emulsified and then added into a reactor; the reactor was heated to 70° C., keeping stirring, and nitrogen was introduced to remove oxygen for more than 30 minutes; 0.001 parts by weight of KPS was added into a reaction system; after reacting for 1 hour, 5 parts by weight of a sodium hydroxide aqueous solution containing 0.05 parts by weight of sodium hydroxide were added, and reaction was continued for 0.5 hour to obtain a block copolymer R-AA$_{m1}$-b-St$_{m2}$-b-(St)$_{n1}$-T in the form of particles stably dispersed in water to form a latex;

Step 2: after the reaction in the step 1 is finished, 10 parts by weight of nBA and 100 parts by weight of deionized water were added, the reaction temperature was adjusted to 45° C., then 0.03 part by weight of VA044 was added, and reacted for 1 hour to obtain a block copolymer R-AA$_{m1}$-b-St$_{m2}$-b-(St)$_{n1}$-b-(nBA)$_{n2}$-T in the form of particles stably dispersed in water to form a latex;

Step 3: after the reaction in the step 2 is finished, 15 parts by weight of MA, 20 parts by weight of EA, 25 parts by weight of MMA, and 30 parts by weight of St were added sequentially, and meanwhile 50 parts by weight of deionized water was added each time, the reaction temperature was kept at 45° C., and meanwhile 0.005 part by weight of VA044 was added, reacted for 5 hours in each stage to obtain a hexablock copolymer R-AA$_{m1}$-b-St$_{m2}$-b-(St)$_{n1}$-b-(nBA)$_{n2}$-b-(MA)$_{n3}$-b-(EA)$_{n4}$-b-(MMA)$_{n5}$-b-(St)$_{n6}$-T, in the form of particles stably dispersed in water to form a latex;

Step 4: the obtained latex was demulsified, cleaned and dried to finally obtain white polymer powders or particles.

Example 4

Step 1: 3 parts by weight of an amphiphilic macromolecule reversible addition-fragmentation chain transfer reagent (2) were dissolved in 50 parts by weight of deionized water while stirring, then 15 parts by weight of nBA were added, stirred and pre-emulsified and then added into a reactor; the reactor was heated to 40° C., keeping stirring, and nitrogen was introduced to remove oxygen for more than 30 minutes; 0.05 parts by weight of VA044 was added into a reaction system; after reacting for 5 hours, 10 parts by weight of a sodium hydroxide aqueous solution containing 0.2 parts by weight of sodium hydroxide were added, and reaction was continued for 0.2 hour to obtain a block copolymer R-AA$_{m1}$-b-St$_{m2}$-b-(nBA)$_{n1}$-T, in the form of particles stably dispersed in water to form a latex;

Step 2: after the reaction in the step 1 is finished, 20 parts by weight of St and 100 parts by weight of deionized water were added, the reaction temperature was adjusted to 75° C., then 0.02 part by weight of KPS was added, and reacted for 2 hours to obtain a block copolymer R-AA$_{m1}$-b-St$_{m2}$-b-(nBA)$_{n1}$-b-(St)$_{n2}$-T, in the form of particles stably dispersed in water to form a latex;

Step 3: after the reaction in the step 2 is finished, 5 parts by weight of EHA, 10 parts by weight of tBA, 15 parts by weight of nBMA, 20 parts by weight of MMA, 25 parts by weight of EHMA and 30 parts by weight of EMA were added sequentially, and meanwhile 50 parts by weight of deionized water was added each time, the reaction temperature was kept at 45° C., and meanwhile 0.005 part by weight of VA044 was added, reacted for 10 hours in each stage to obtain an octablock copolymer R-AA$_{m1}$-b-St$_{m2}$-b-(nBA)$_{n1}$-b-(St)$_{n2}$-b-(EHA)$_{n3}$-b-(tBA)$_{n4}$-b-(BMA)$_{n5}$-b-(MMA)$_{n6}$-(EHMA)$_{n7}$-b-(EMA)$_{n8}$-T, in the form of particles stably dispersed in water to form a latex;

Step 4: the obtained latex was demulsified, cleaned and dried to finally obtain white polymer powders or particles.

Example 5

Step 1: 1 part by weight of an amphiphilic macromolecule reversible addition-fragmentation chain transfer reagent (2) was dissolved in 30 parts by weight of deionized water while stirring, then 10 parts by weight of St were added, stirred and pre-emulsified and then added into a reactor; the reactor was heated to 70° C., keeping stirring, and nitrogen was introduced to remove oxygen for more than 30 minutes; 0.001 parts by weight of KPS was added into a reaction system; after reacting for 2 hours, 5 parts by weight of a sodium hydroxide aqueous solution containing 0.05 parts by weight of sodium hydroxide were added, and reaction was continued for 0.5 hour to obtain a block copolymer R-AA$_{m1}$-b-St$_{m2}$-b-(St)$_{n1}$-T, in the form of particles stably dispersed in water to form a latex;

Step 2: after the reaction in the step 1 is finished, 10 parts by weight of a mixture of nBA and nBMA (nBA/nBMA=1/1) and 100 parts by weight of deionized water were added, the reaction temperature was adjusted to 40° C., then 0.01 part by weight of VA044 was added, and reacted for 4 hours to obtain a block copolymer R-AA$_{m1}$-b-St$_{m2}$-b-(St)$_{n1}$-b-(nBA-co-nBMA)$_{n2}$-T, in the form of particles stably dispersed in water to form a latex;

Step 3: after the reaction in the step 2 is finished, 10 parts by weight of a mixture of MA and MMA(MA/MMA=1/2), 10 parts by weight of a mixture of EA and EMA (EA/EMA=1/3), 10 parts by weight of a mixture of EHA and EHMA(EHA/EHMA=1/4), and 10 parts by weight of St were added sequentially, and meanwhile 50 parts by weight of deionized water was added each time, the reaction temperature was kept at 45° C., and meanwhile 0.01 part by weight of VA044 was added, reacted for 6 hours in each stage to obtain a hexablock copolymer R-AA$_{m1}$-b-St$_{m2}$-b-(St)$_{n1}$-b-(nBA-co-nBMA)$_{n2}$-b-(MA-co-MMA)$_{n3}$-b-(EA-co-EMA)$_{n4}$-b-(EHA-EMHA)$_{n5}$-b-(St)$_{n6}$-T, in the form of particles stably dispersed in water to form a latex;

Step 4: the obtained latex was demulsified, cleaned and dried to finally obtain white polymer powders or particles.

What is claimed is:

1. A preparation method for a multiblock copolymer with narrow molecular weight distribution, wherein a structural general formula of the multiblock copolymer is R—X$_{m1}$-b-Y$_{m2}$-b-(M$_1$)$_{n1}$-b-(M$_2$)$_{n2}$-b-(M$_3$)$_{n3}$ . . . -b-(M$_j$)$_{nj}$-T, wherein R is an isopropyl acid group, acetoxy, 2-nitrile acetoxy or 2-amino acetoxy; in X$_{m1}$, X is a methacrylic acid monomer unit or an acrylic acid monomer unit, m$_1$ is an average polymerization degree of X, and m$_1$=10-40; in Y$_{m2}$, Y is a styrene monomer unit or a methyl methacrylate monomer unit, m$_2$ is an average polymerization degree of Y, and m$_2$=3-10; M$_1$, M$_2$, M$_3$ . . . M$_j$ are comonomers of the copolymer, and are selected from styrene, methyl acrylate, ethyl acrylate, butyl acrylate, tert-butyl acrylate, isobutyl acrylate, 2-ethylhexyl acrylate, methyl methacrylate, ethyl methacrylate, tert-butyl methacrylate, n-butyl methacrylate, methyl 2-ethylhexyl acrylate, acrylonitrile, isoprene, butadiene, or a mixture of some monomers thereof, where j=5-20; n$_1$, n$_2$, n$_3$ . . . n$_j$ are average polymerization degrees of respective blocks of the polymer, and n$_1$, n$_2$, n$_3$ . . . =50-2000; T is an alkyl dithioester group or an alkyl trithioester group; and a final PDI of the polymer is less than 2.0, wherein the preparation method comprises:

step 1 of dissolving 0.6-3 parts by weight of an amphiphilic macromolecule reversible addition-fragmentation chain transfer reagent in 20-50 parts by weight of water while stirring, subsequently adding 5-15 parts by weight of an M$_1$ monomer, stirring and pre-emulsifying to obtain a mixture, and then adding the mixture into a reactor; heating the reactor to 30-80° C., keeping stirring, and introducing nitrogen to remove oxygen for more than 30 minutes; adding 0.001-0.05 parts by weight of an initiator into a reaction system; after reacting for 1-5 hours, adding 5-10 parts by weight of a sodium hydroxide aqueous solution containing 0.05-0.2 parts by weight of sodium hydroxide, and continuing to react for 0.2-0.5 hour to obtain a block copolymer R-X$_{m1}$-b-Y$_{m2}$-b-(M$_1$)$_{n1}$-T, in a form of particles stably dispersed in water to form a latex;

step 2 of after the reaction in the step 1 is finished, adding 5-30 parts by weight of an M$_2$ monomer and 20-100 parts by weight of water, keeping a reaction temperature unchanged or adjusting the reaction temperature within a range of 30-80° C., then adding 0.001-0.05 part by weight of the initiator, and reacting for 1-10 hours to obtain a block copolymer R—X$_{m1}$-b-Y$_{m2}$-b-(M$_1$)$_{n1}$-b-(M$_2$)$_{n2}$-b-T, in the form of particles stably dispersed in water to form a latex;

step 3 of after the reaction in the step 2 is finished, sequentially adding 5-30 parts by weight of M$_3$, M$_4$ . . . M$_j$ monomers and 20-100 parts by weight of water, keeping the reaction temperature unchanged or adjusting the reaction temperature within a range of 30-80° C., then adding 0.001-0.05 part by weight of the initiator, and reacting for 1-15 hours in each reaction segment to obtain a j-block copolymer R—X$_{m1}$-b-Y$_{m2}$-b-(M$_1$)$_{n1}$-b-(M$_2$)$_{n2}$-b-(M$_j$)$_{nj}$-T, in a form of particles stably dispersed in water to form a latex; and step 4 of demulsifying, cleaning and drying the obtained latex to finally obtain white or yellowish polymer powder or particles, wherein when the M$_1$, M$_2$ . . . M$_j$ monomers are styrene, methyl methacrylate, ethyl methacrylate, tert-butyl methacrylate, n-butyl methacrylate, 2-ethylhexyl methacrylate, acrylonitrile, or a mixture of some monomers thereof, the reaction temperature in step 2 or step 3 is adjusted to 60-80° C.; and when the M$_1$, M$_2$ . . . M$_j$ monomers are methyl acrylate, ethyl acrylate, n-butyl acrylate, tert-butyl acrylate, isobutyl acrylate, 2-ethylhexyl acrylate, isoprene butadiene or a mixture of some monomers thereof, the reaction temperature in step 2 or step 3 is adjusted to 30-60° C.

2. The preparation method according to claim 1, wherein a structural general formula of the amphiphilic macromolecule reversible addition-fragmentation chain transfer reagent is:

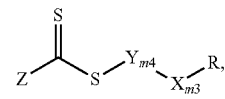

wherein, in the structural general formula of the amphiphilic macromolecule reversible addition-fragmentation chain transfer reagent, Z is alkylthio, alkyl, phenyl or benzyl with 4 to 12 carbon atoms, S is sulfur element, Y is a styrene monomer unit or methyl methacrylate unit, X is a methacrylic acid monomer unit or acrylic acid monomer unit, and R is isopropyl acid group, acetoxy, 2-nitrile acetoxy or 2-amino acetoxy; $m_3$ is the average polymerization degree of the X monomer unit, $m_{3=3}$-40, $m_4$ is the average polymerization degree of the Y monomer unit, $m_{4=10}$-10.

3. The preparation method according to claim 1, wherein when the reaction temperature in step 2 or step 3 is a temperature greater than 60° C. and smaller than or equal to 80° C., the initiator is ammonium persulfate, potassium persulfate, hydrogen peroxide or hydrogen peroxide derivatives; when the reaction temperature in step 2 or step 3 is a temperature greater than or equal to 30° C. and smaller than 60° C., the initiator is azodiisobutylimidazoline hydrochloride, azodiisobutylamidine hydrochloride, 2-hydroxy-4'-(2-hydroxyethoxy)-2-methylphenylacetone, a sodium hydrogen persulfate/potassium persulfate redox initiator, or a sodium persulfate/ammonium persulfate redox initiator.

* * * * *